Dec. 1, 1931.                C. E. SHAW                1,834,655
                       ELECTRIC WELDING SHIELD
                        Filed Dec. 28, 1929
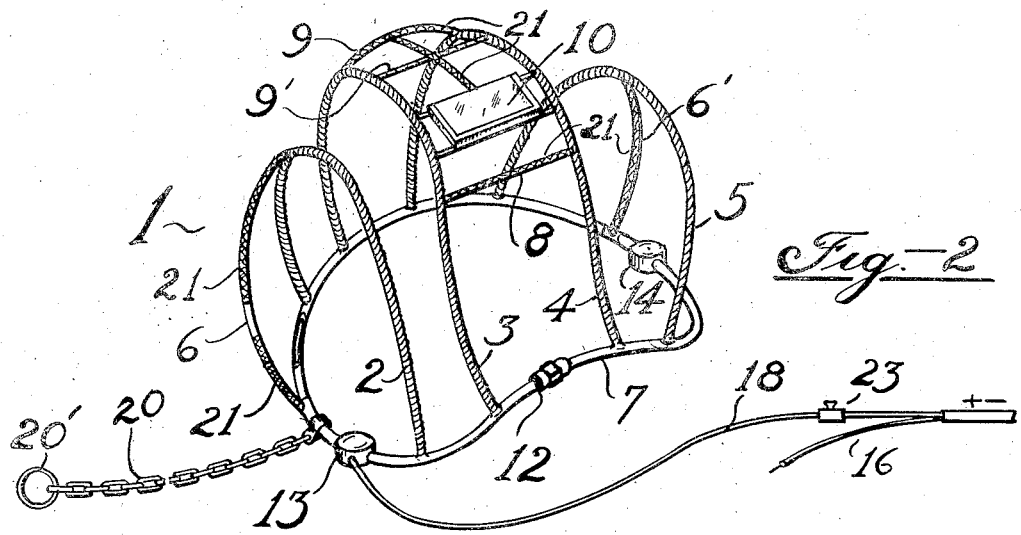
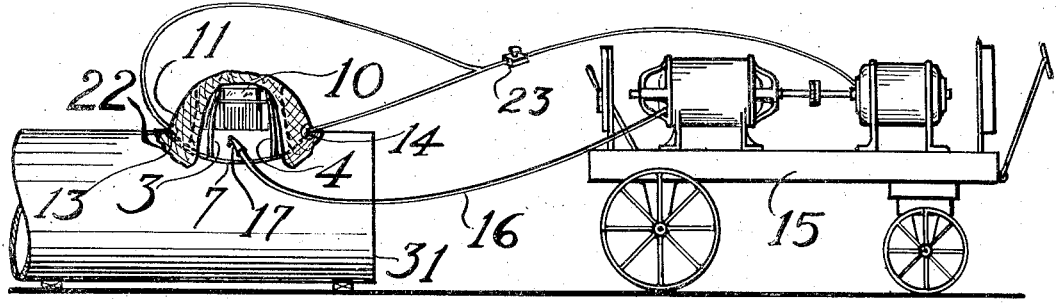
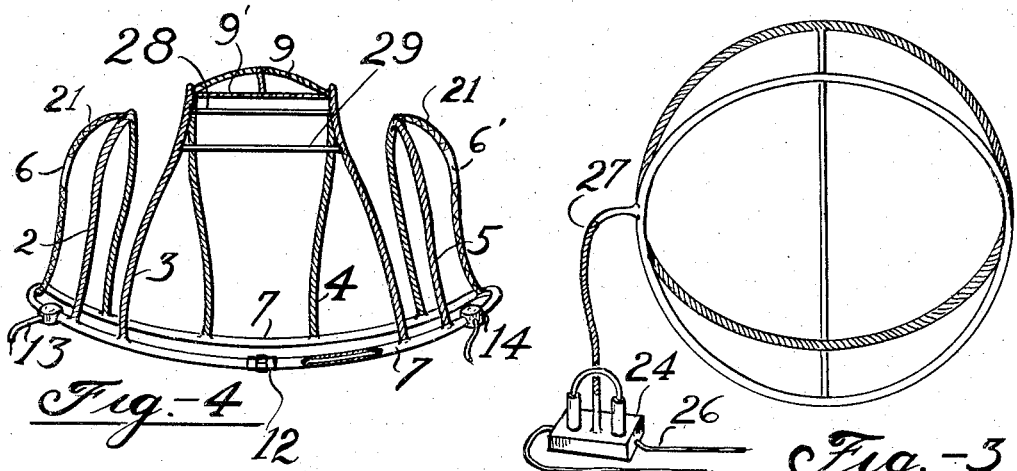
INVENTOR
Charles E. Shaw
BY
ATTORNEY Patented Dec. 1, 1931

1,834,655

UNITED STATES PATENT OFFICE

CHARLES E. SHAW, OF CRANFORD, NEW JERSEY, ASSIGNOR TO STANDARD OIL DEVELOPMENT COMPANY, A CORPORATION OF DELAWARE

ELECTRIC WELDING SHIELD

Application filed December 28, 1929. Serial No. 417,023.

This invention relates to protective devices for application to materials or articles undergoing treatment which may injure the workmen or bystanders, due to intense light, sparks, flying fragments, or the like. The invention is particularly designed for use in connection with the welding of ferrous metals by the electric arc method. It will be described in this connection, but it is to be understood that it is not limited thereto. A principal object of the invention is to provide a shield adapted to be held in place on the work by magnetic attraction and sufficiently flexible to be adjusted to fit all ordinary working conditions.

The invention will be fully understood from the following description, read in connection with the accompanying drawings, in which Fig. 1 is a diagrammatic side elevation showing the protective shield of the present invention applied to a pipe which is to be welded;

Fig. 2 is an enlarged perspective view showing the framework of the shield;

Fig. 3 is a perspective view showing a modified form of the device; and

Fig. 4 is a side elevation of a further modification.

Referring first to Figs. 1 and 2 of the drawings, reference number 1 indicates in general the shield framework, which comprises four bows, 2, 3, 4 and 5, and braces 6 and 6'. The bows and braces are connected at their bottoms to the base rim 7. Bows 3 and 4 are joined by cross pieces 8 and 9 and also carry between them a welder's dark glass 10. The framework has a cover 11, preferably made of asbestos fabric, canvas, or other flexible material. This cover extends over the entire framework, except the area between bows 3 and 4, rim 7 and crosspiece 8 and the area between crosspiece 9 and a bar 9'. These two open spaces are respectively for the introduction of the welding torch or the like and for the ventilation of the shield.

When the shield is to be used in connection with arc welding or other high temperature methods, a fireproof paint should be applied to the cover, if of inflammable material. This paint will also serve to prevent passage of light rays which might be injurious to the eye.

The framework for most uses must be made of material having a high degree of flexibility. I prefer to make the bows 2, 3, 4 and 5 flexible metallic tubing. The ordinary electric tubing is suitable. The rim 7 is best made of copper or brass flexible tubing. A coupling 12 should be provided in the rim 7 so that it may be easily separated. This is necessary when the shield is to be fitted into a corner.

One or more magnets are connected to the rim 7. Two magnets, 13 and 14, are shown arranged at opposite sides of the framework. While I contemplate the use of magnetic bodies generally, for most purposes it is necessary to use electro-magnets to insure that the shield will be held securely in position on the work.

The electric current for the electro-magnets may be secured from any suitable source. When the shield is used in connection with arc welding, it is most convenient to take the current for the magnets from the welding machine. This is illustrated in Fig. 1, in which 15 designates any suitable type of welding machine, from which a lead 16 takes current to the welding torch 17. Another lead 18 takes direct current from the exciter of the machine to the magnets 13 and 14. These two leads have been shown separately for clearness but in practice they will be combined for the greater portion of their length for easy handling. It is necessary to have a separate wire from the exciter to the magnets as the variations of the welding current, due to the striking of the arc and other causes, make the magnets work improperly. The magnets may be connected in series or in parallel and any suitable number may be used.

It is desirable to secure a chain 20 to the frame. The chain has a ring 20' at its end. When the shield is to be applied, for example, to a vertical or steeply inclined surface, the ring will be lightly spot welded to the work so that the shield will not fall if for any reason the magnets become demagnetized.

The frame should be insulated by tape 21 or the like to prevent the welder from accidentally striking an arc to it. The magnets and other current-carrying parts of the device are suitably insulated.

The canvas may be secured to the insulated framework in any suitable way, as by spreading it over the framework and sewing the bottom edges to the rim 7 and wherever else may be necessary. I prefer to allow the bottom edge of the canvas to extend six inches or so below the rim, as shown at 22.

The current to the magnets may be controlled by a switch 23 in the lead 18.

Referring to Fig. 3, a single magnet 24 is provided, electric current being supplied to it through the leads 25 and 26. A flexible arm 27 is secured at one end to the base of the magnet and at the other end carries a flexible framework of the type previously described. This form of the invention may or may not have the dark glass, depending on the conditions under which the shield is to be used.

In Fig. 4, I have illustrated a form of the invention similar to that shown in Figs. 1 and 2. In Fig. 4, however, there are provided two rods 28 and 29 above the opening for the introduction of the tools. These rods are spaced so as to receive and hold the usual hand shield used in welding work. Such shields have a lens housing which extends through the back and may be inserted between rods 28 and 29.

The improved protective shield is used in the following manner, having reference particularly to arc welding: Assuming that it is desired to weld a large metallic object, such as the pipe 31 shown in Fig. 1, the welder adjusts the shield over the area to be operated upon. It will be noted that the construction of the shield is such that it can be shaped to conform to almost any curvature, since the frame-work is formed of flexible material. The welder then connects the lead 18 with the magnets and turns on the current to energize them. He then proceeds with the welding in the usual way. The opening in the shield gives ample room for operation of the welding torch. The welder may observe the work through the dark glass or he may use the hand shield. The work is covered to such an extent that persons nearby cannot be injured by the light from the arc.

The shield of the present invention is preferably made of substantial size, for example, about 2 to 3 feet long and 18 to 24 inches high. Accordingly, it is not necessary to move the shield very frequently since the rate at which arc welding can be done is not rapid. When the shield is to be moved, it is only necessary to cut off the current from the magnets. Various forms of mechanically attached shields have been heretofore proposed but they have not proved successful because of the difficulty in securing them to the work under varied conditions. In the present invention the shield can be placed at any point desired, the only requirement being that the material operated upon or appurtenant parts be of a magnetic character.

The several forms of the invention illustrated and described are given for illustration only and various changes and alternative arrangements may be made within the scope of the appended claims, in which it is my intention to claim all novelty inherent in the invention as broadly as the prior art permits.

I claim:

1. A protective shield for use during industrial operations, said shield comprising a framework made of flexible metallic tubing, a cover for the framework, and a magnet associated with the framework for holding it in operative position.

2. A protective shield for use during industrial operations, said shield comprising a framework made of flexible metallic tubing, a flexible fabric cover for the framework, and a magnet associated with the framework for holding it in operative position.

3. A protective shield for use during industrial operations on metallic objects, said shield comprising a flexible framework, a flexible base rim included in the framework, a magnetizable body associated with the rim and means for magnetizing the body to hold the rim in position on the work.

4. For use in combination with an arc welding machine, a protective shield comprising a flexible framework, a flexible cover on the framework, said cover having an opening of adequate size for the introduction of a welding torch, an electro-magnet associated with the framework, and means for supplying electric current to the torch and magnet.

5. Apparatus according to claim 4, in which a welder's dark glass is arranged in the upper portion of the framework.

6. A protective shield for use during industrial operations on metallic objects, said shield comprising a plurality of flexible bows, a flexible base rim, braces connecting the bows and rim, a flexible cover secured to the bows and rim, said cover having an opening for the introduction of a tool, and means for securing the device to the work.

7. Apparatus according to claim 6, in which a fire-proof flexible cover is provided.

8. Apparatus according to claim 6, in which a welder's dark glass is carried between two of the bows.

9. Apparatus according to claim 6, in which a pair of electro-magnets disposed at spaced points on the rim are provided.

10. Apparatus according to claim 6, in which a plurality of electro-magnets disposed at spaced points on the rim are provided, and the means for supplying current to the magnets includes leads from an electric welding machine.

11. A protective shield for use during industrial operations on metallic objects, said shield comprising a flexible framework, an electro-magnet, and a flexible connection between the framework and the electro-magnet.

CHARLES E. SHAW.